United States Patent
Stepan et al.

(10) Patent No.: US 9,520,700 B2
(45) Date of Patent: Dec. 13, 2016

(54) MACHINES AND METHODS FOR REMOVING SCREEN FROM CABLE

(71) Applicant: SCHLEUNIGER HOLDING AG, Thun (CH)

(72) Inventors: Peter Stepan, Mels (CH); Michael Jost, Thun (CH)

(73) Assignee: Schleuniger Holding AG, Thun (CH)

( * ) Notice: Subject to any disclaimer, the term of this patent is extended or adjusted under 35 U.S.C. 154(b) by 427 days.

(21) Appl. No.: 14/135,702

(22) Filed: Dec. 20, 2013

(65) Prior Publication Data

US 2014/0174267 A1    Jun. 26, 2014

(30) Foreign Application Priority Data

Dec. 20, 2012    (EP) .................................... 12198704

(51) Int. Cl.
*H02G 1/12*    (2006.01)
*B26D 7/08*    (2006.01)

(52) U.S. Cl.
CPC *H02G 1/12* (2013.01); *B26D 7/08* (2013.01); *H02G 1/1273* (2013.01);
(Continued)

(58) Field of Classification Search
CPC ........ H02G 1/12; H02G 1/1297; H02G 1/005; H02G 1/1202; H02G 1/1236; B26D 7/08
See application file for complete search history.

(56) References Cited

U.S. PATENT DOCUMENTS 1,969,517 A * 8/1934 Malloy ...................... H01J 9/06
140/140
3,447,177 A * 6/1969 Williams ............. H02G 1/1285
15/23
(Continued)

FOREIGN PATENT DOCUMENTS

CA    2466269 A1    7/2003
DE    1918467 A1    10/1970
(Continued)

OTHER PUBLICATIONS

EPO search report and written opinion from priority EPO application EP12198704, dated May 16, 2013, in German.

*Primary Examiner* — Robert Scruggs
(74) *Attorney, Agent, or Firm* — Davis & Bujold PLLC; Michael J. Bujold

(57) ABSTRACT

Machines and methods for removing screens from cable, wherein screen surrounds at least one electrical or optical conductor (22). The screen may be a braided screen (21) from a cable (19) including at least one conductor (22), screen (21), and outer insulation (20). After baring screen (21) by removing outer insulation (20), a section is deformed and/or unbraided, and then the deformed section of the screen (21) is cut off. The step of deforming and/or unbraiding is accomplished by lifting-off the screen (21) from the inner conductor (22) on at least one end of the section of the screen (21) to be removed, at least over a part of the circumference of the cable. This step additionally includes or may be followed by pressing the parts of the screen (21), that have been lifted off onto an erection surface (28) before cutting them off, whereby preferably the parts of the screen (21) that have been lifted off are bent backwards in the direction of the yet undeformed screen (21).

20 Claims, 12 Drawing Sheets

(52) U.S. Cl.
CPC ........ *H02G 1/1297* (2013.01); *Y10T 83/0419* (2015.04); *Y10T 83/343* (2015.04)

(56) References Cited

U.S. PATENT DOCUMENTS

| | | | |
|---|---|---|---|
| 3,720,973 A | 3/1973 | Bogese | |
| 4,527,451 A | 7/1985 | Davis | |
| 4,633,570 A | 1/1987 | Burgit et al. | |
| 5,074,169 A | 12/1991 | Matz | |
| 5,138,910 A * | 8/1992 | Ishikawa | H02G 1/1256 29/33 M |
| 5,927,175 A * | 7/1999 | Franks | B23D 21/00 225/96 |
| 6,330,839 B1 * | 12/2001 | Amrein | H02G 1/1273 29/828 |
| 7,026,572 B2 | 4/2006 | Dietrich | |

FOREIGN PATENT DOCUMENTS

| | | |
|---|---|---|
| DE | 2540933 A1 | 4/1977 |
| DE | 4327356 A1 | 2/1995 |
| DE | 20106347 U1 | 11/2001 |
| DE | 20211143 U1 | 10/2002 |
| EP | 1054494 A2 | 11/2000 |
| EP | 1054494 A3 | 1/2002 |
| EP | 1096628 B1 | 7/2004 |
| EP | 1443619 B1 | 6/2006 |
| EP | 2117089 A1 | 11/2009 |
| GB | 1240665 A | 7/1971 |
| JP | S52-153192 A | 12/1977 |
| JP | H01-241780 A | 9/1989 |
| JP | H04-033509 A | 2/1992 |
| JP | H05-184033 A | 7/1993 |
| JP | 2000-032626 A | 1/2000 |
| JP | 2004-064970 A | 2/2004 |
| JP | 2007-279200 A | 10/2007 |
| JP | 2008-005586 A | 1/2008 |
| JP | 2010-011599 A | 1/2010 |
| WO | 2007/086865 A1 | 8/2007 |
| WO | 2008/062375 A2 | 5/2008 |
| WO | 2008/062375 A3 | 8/2008 |

* cited by examiner

MACHINES AND METHODS FOR REMOVING SCREEN FROM CABLE

This application claims benefit of priority to prior European (EPO) application no. EP12198704 filed on Dec. 20, 2012 and the entirety of prior European application no. EP12198704 is hereby expressly incorporated herein by reference, in its entirety and as to all its parts, for all intents and purposes, as if set forth identically in full herein.

The present disclosure relates to methods for removing a screen from a cable and to machines for carrying out such methods.

As is known, an electrical or optical cable is provided with a number of wires having insulated conductors and with at least one film surrounding at least a part of the wires. The film has the function of a separating and/or screening film. Such cables are stripped manually during use in the field in order to bare the individual conductors for further processing steps. A continuous surrounding film considerably complicates the insulation stripping process. In addition, if it is a data cable that contains wires surrounded in pairs with film, and/or if the film is coated at least on one side with adhesive in order to ensure better adhesion to the wires or of the wires to one another, then the insulating stripping process is additionally complicated and very time-consuming.

For facilitating the insulation stripping process, a solution from DE 20211143U1 is known, where a film surrounding the cable are provided with incisions, such as slits, notches or small holes. These incisions are preferably introduced into the film at regular intervals, in order to enable a fitter to separate off a film section more easily. However, since they are introduced over the total length of the cable, these incisions reduce the screening and/or sealing function of the film. This is particularly disadvantageous in the case of data cables if, as is usual, for example, in the case of highly accurate measuring processes, optimized transmission properties are required.

EP1096628A1, considered as the nearest state of the art, discloses a method and a device for separating the screen from a cable, in which the screen oriented in the axial direction of the cable and surrounding the electrical conductors is bared at least at one cable end by cutting to length and removing an insulation sheath. The bared screen is deformed by a translational movement oriented in the axial direction thereof and is compressed to give an annular bead that is larger relative to the insulation sheath and is oriented outward in the circumferential direction. This annular bead is then cut by means of a cutting unit guided transversely to the longitudinal direction of the cable, around the cable. A device which is suitable for cutting off and removing from an electrical cable the screen bared at least at one end by cutting an insulation sheath to length is proposed for carrying out the known method. Two clamping devices arranged with the same axial direction a distance apart for pushing in the cable, and a cutting unit that is arranged in between and can feed the screen approximately transversely to the theoretical longitudinal axis of the cable and is intended for cutting an annular bead formed by axially compressing the screen, are provided.

DE4327356A1 describes a device for stripping the insulation from the stranded conductors. It is provided with a conductor feed and transport device, a cutting device, a device for cutting to length, and a clamping device for the stranded conductor. For notching the insulation of the stranded conductor, the cutting device can be advanced from at least two sides radially onto said conductor and can be displaced in the conductor direction in this position. In addition, the conductor is guided in the sleeve whose free end is conically tapered and whose truncated cone end rests against the outer surface of the insulation. The cutting device can be displaced toward the sleeve and pushes the insulation present between the sleeve and the cutting device onto the sleeve. At least two radial cutting edges projecting from the outer surface are provided on the outer surface of the sleeve, which cutting edges cut in the axial direction through the insulation pushed onto the sleeve. The insulation is compressed in a bellows-like manner by means of the cutting device and the sleeve and then cut or punched as a result of the mutual axial movement of the cutting device and the sleeve. A similar technology is disclosed, for example, in U.S. Pat. No. 5,074,169.

All methods with bellows-like formation and subsequent punching require a certain minimum length of braided screen to enable the bellows to be properly produced. The insulation stripping length of the braided screen is therefore associated with minimum dimensions.

Screened cables are increasingly being used in practice. The clean removal of the braided cable screen, particularly for cables having a noncircular cross-section, without damage to the various cable layers located under the braided screen is therefore still very complicated and is at present generally carried out manually since the abovementioned technologies are not suitable particularly for noncircular cables, and the abovementioned disadvantages occur. Most of the known devices are very complicated and many cable-specific elements are needed, making these devices and methods inflexible.

It is an object within the scope of the present disclosure to simplify the insulation stripping process in the case of screened cables having high requirements with regard to their screening function. With machines according to aspects of the present disclosure, it is intended to remove the braided screen of a cable (e.g. in the case of coaxial cables, multi-conductor cables, etc) mechanically or in an automatable manner at exactly predetermined positions, reliably and without damage to the material layers or inner conductors present underneath the braided screen. There should also be the capability use in the case of those cables which have no coaxial cross-section, i.e. are noncircular or even very noncircular. Furthermore, being able to carry out an insulation stripping process according to aspects of the present disclosure should not depend on the exact cable diameter. That is to say, cables of different diameters should be capable of being freed from the screen without significant adjustability and without problems. Moreover, the axial length of the braided screen to be removed should be unimportant.

Deforming and/or unbraiding the screen by lifting off the screen from the at least one inner conductor on at least one end of the section of the screen to be removed, at least over a part of the circumference of the cable, omits grabbing the cable at two locations and is therefore much more effective, quicker and easier than the known deforming methods. The additional step of pressing the parts of the screen which have been lifted off onto an erection surface before cutting them off, ensures that the parts of the screen to be cut off, in particular the unbraided screen fibers, come to rest in a position and orientation for being easily cut by means of relatively simple tools. The fibers or other screen parts lie next to one another and are no longer braided with one another, even during the process of gentle unbraiding and lifting off and erecting. Said gentle process for the screen, preferably carried out with a deformation and/or unbraiding unit comprising at least one rotating member with its axis of rotation oblique to the section of the longitudinal axis of the cable at the location of the rotating member, for pressing the parts of the lifted screen onto an erection surface, also protects the conductors from being damaged. The erection surface shields the section of the cable to remain complete from the impact and effects of the rotating member and contributes to achieve the desired orientation and direction of the screen filaments or part to be cut off.

Compared with the known systems, virtually any cables, including fairly soft and completely noncircular cables, may be freed from the braided screen satisfactorily and easily. The most frequent conventional types of screen cutting devices require, according to the prior art, inconvenient pushing-up of the screen in order to be able to cut off the screen in the pushed-up state. Relatively pliable cables cannot be freed from the screen or can be freed from the screen only over a short distance by pushing up the screen. This pushing-up can be completely eliminated. The present disclosure makes it possible to free a large number of very different cables (round, noncircular, twisted, twisted pair, etc.) from the braided screen without problems, by means of a few exchangeable guide parts, without damaging the lower insulation or the inner conductors.

More details are given below with reference to the attached drawings of versions of machines within the scope of the present disclosure.

Figure 4:
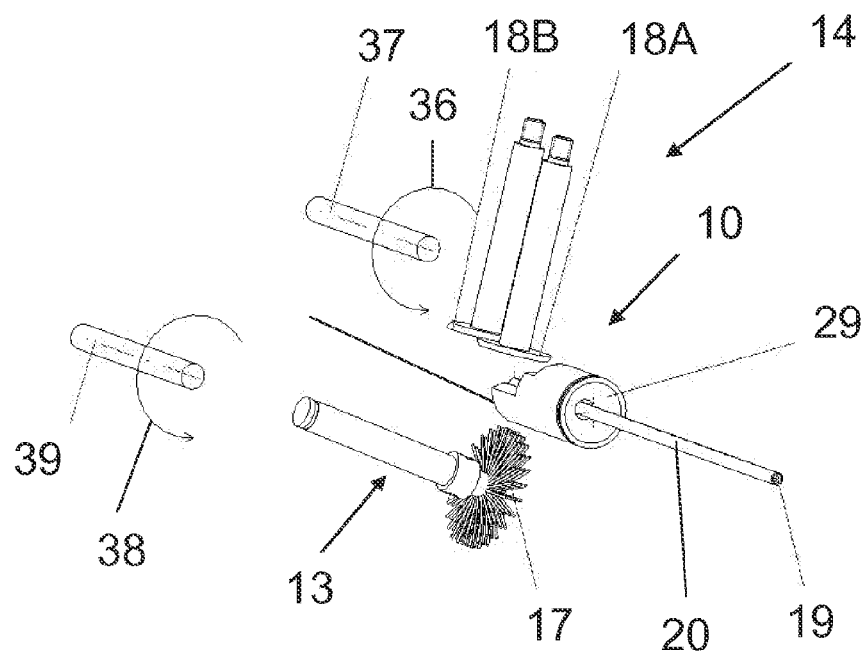
Figure 5:
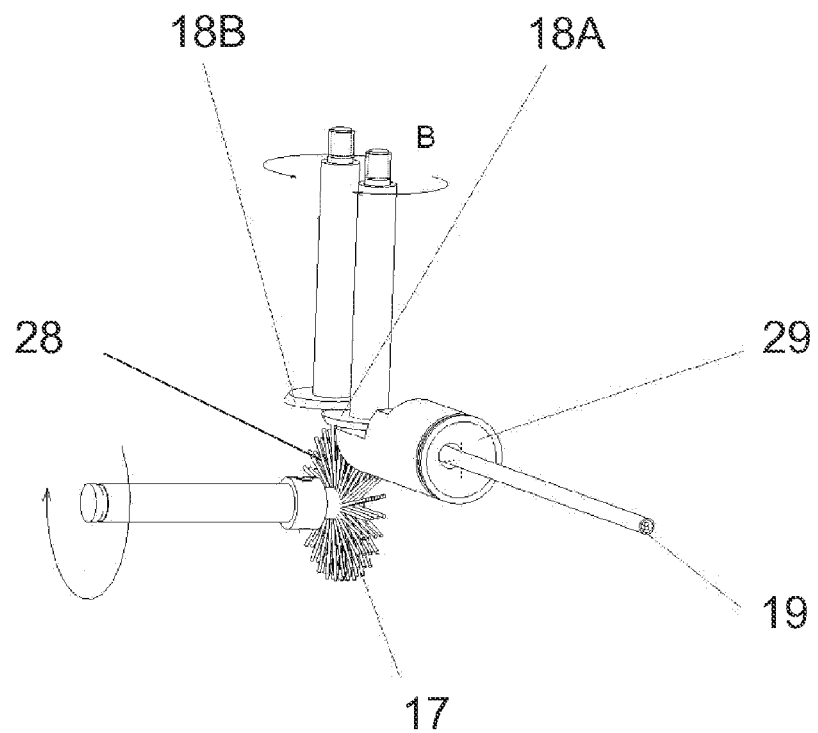
Figure 6:
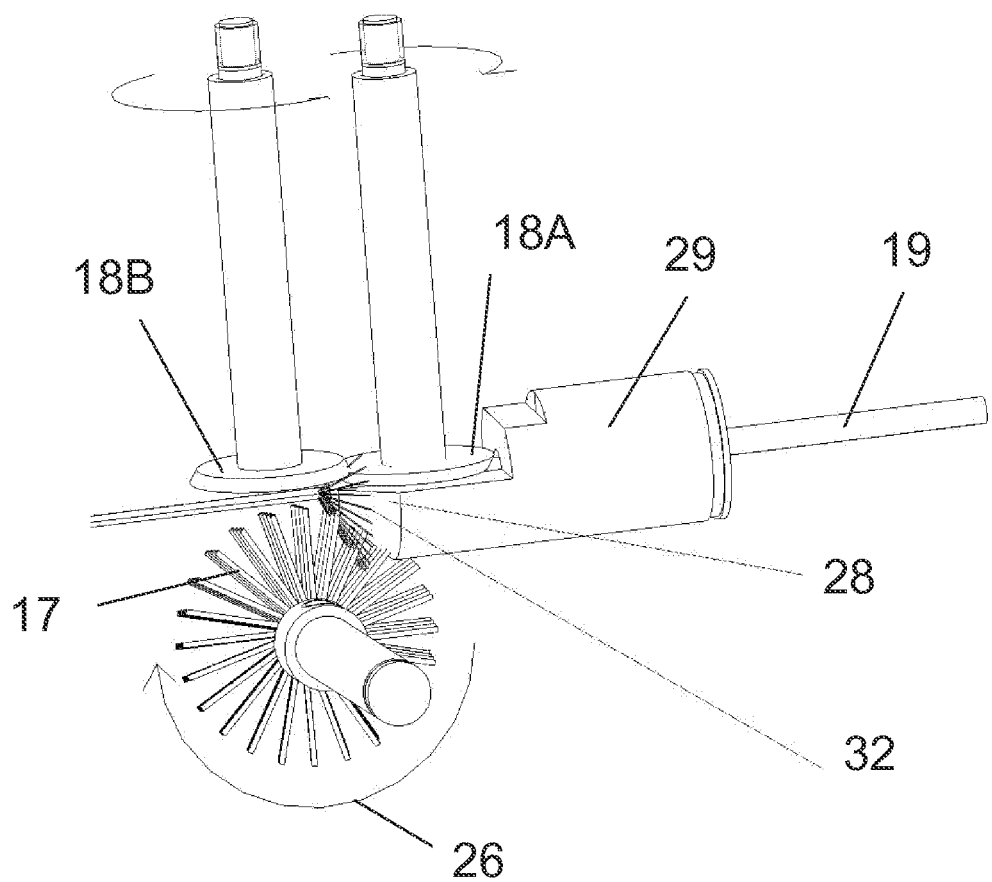
Figure 7:
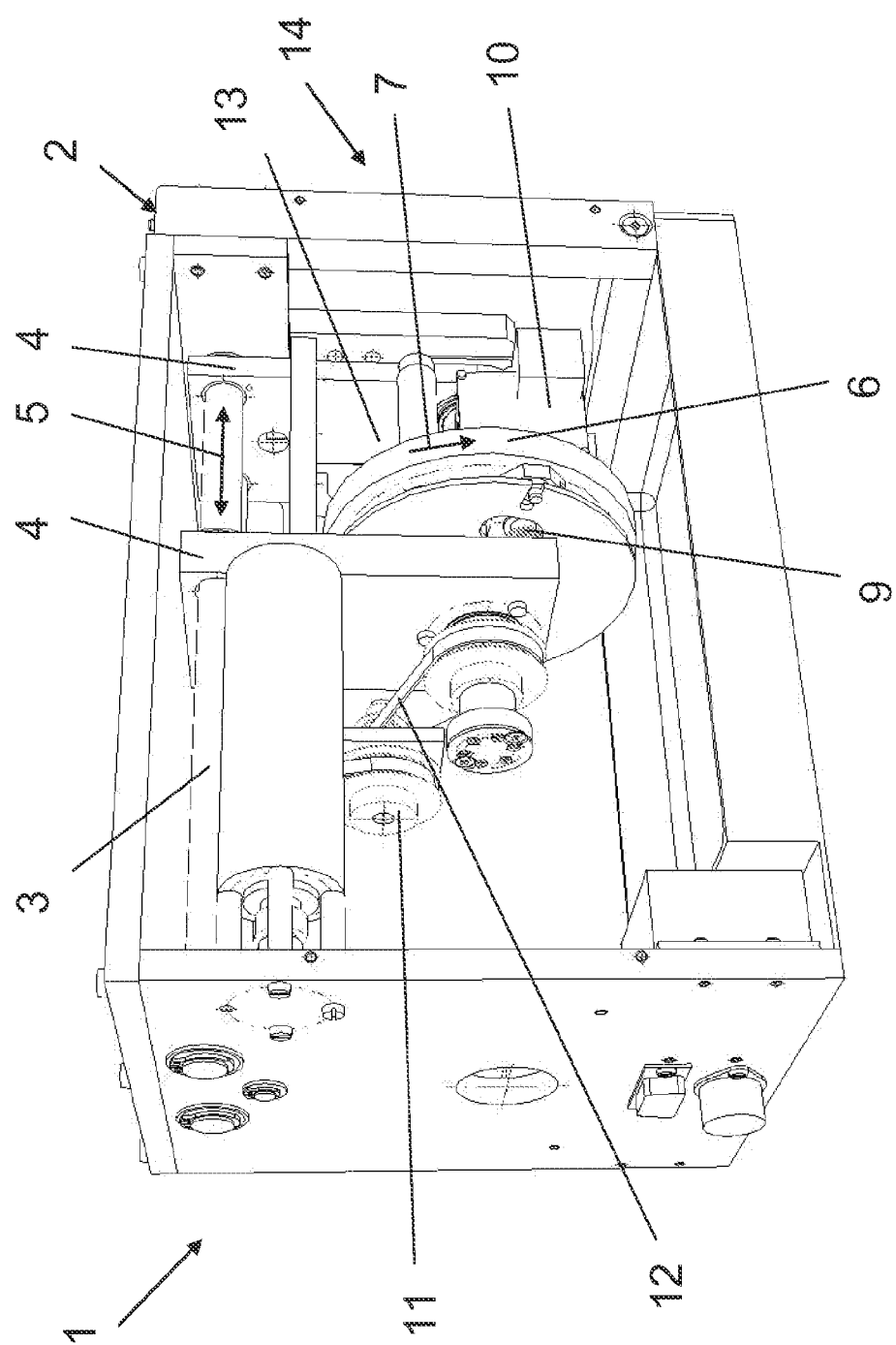
Figure 8:
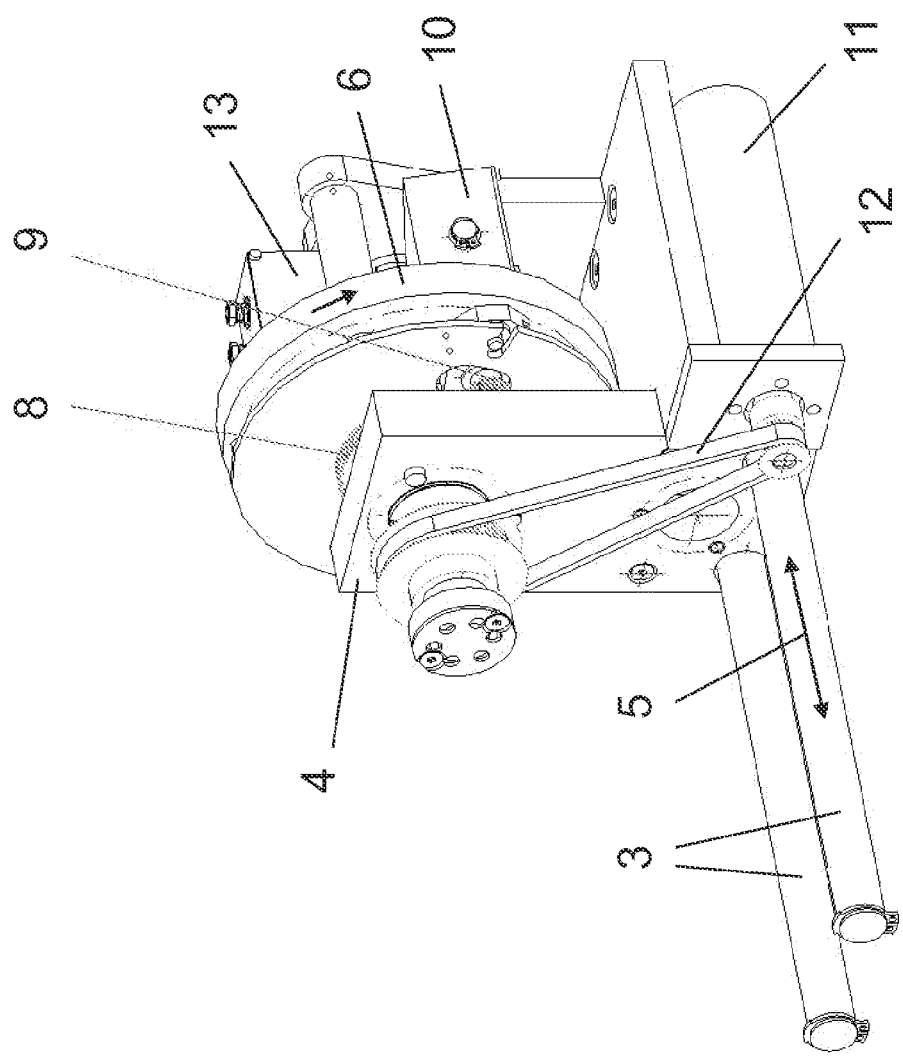
Figure 9:
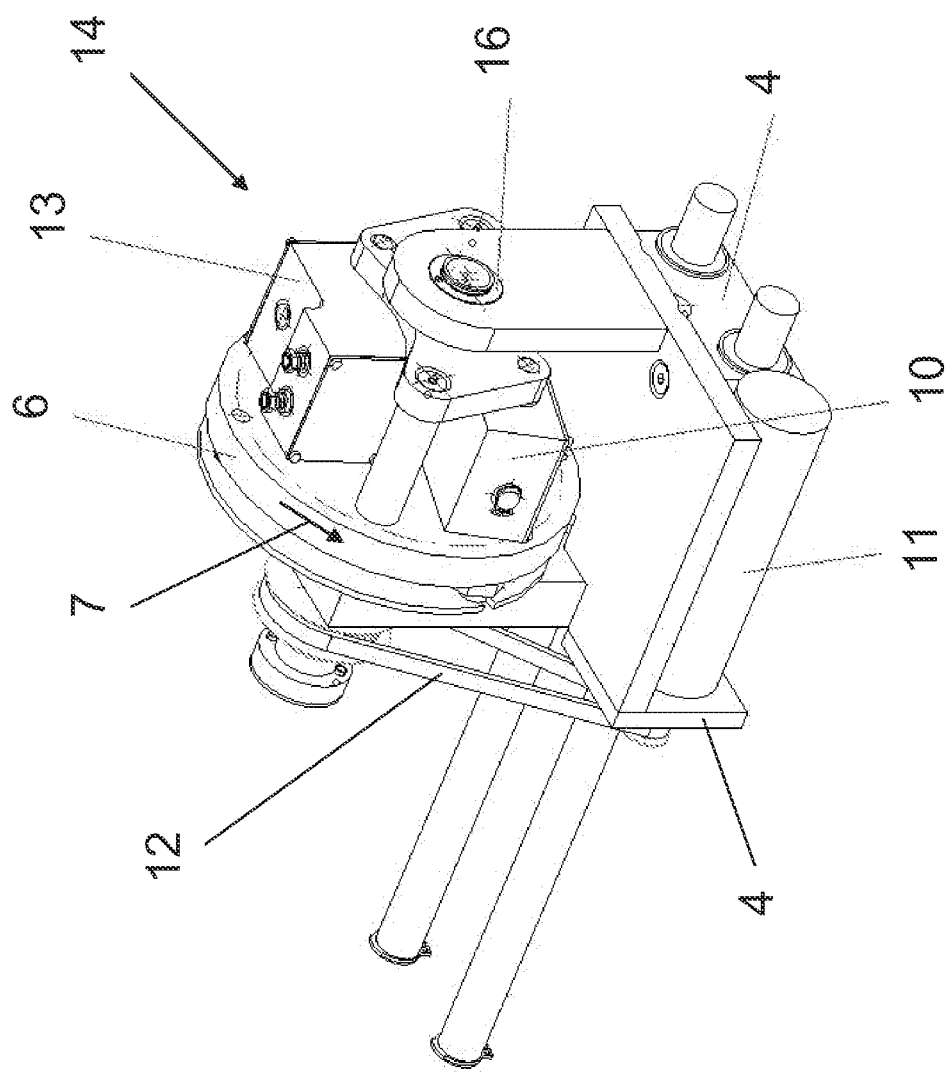
Figure 10:
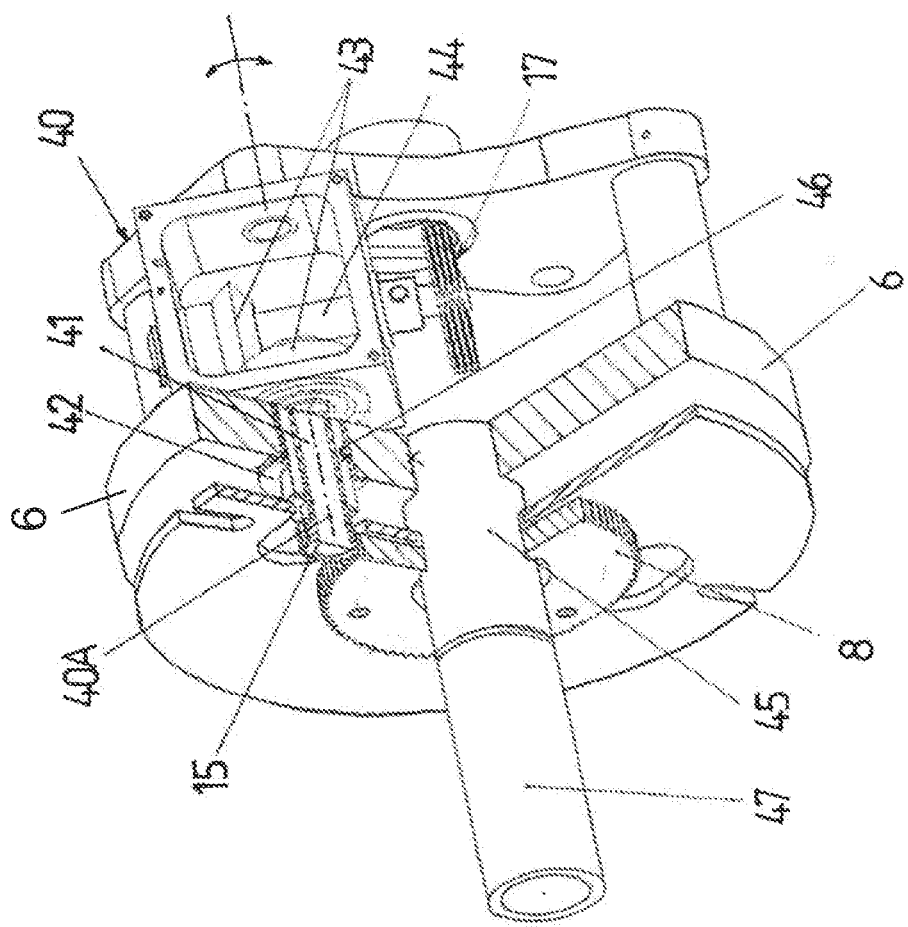
Figure 11:
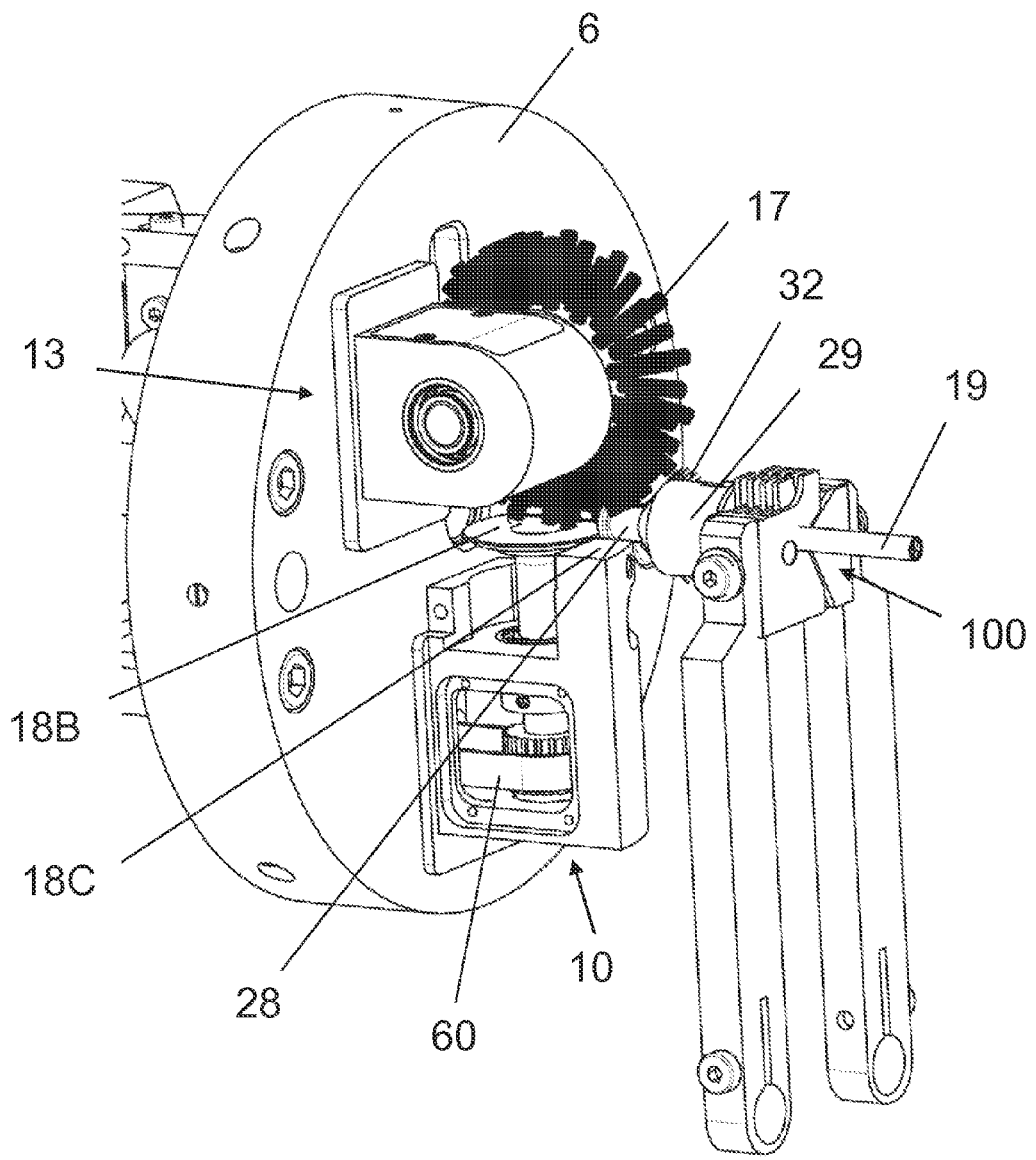
Figure 12:
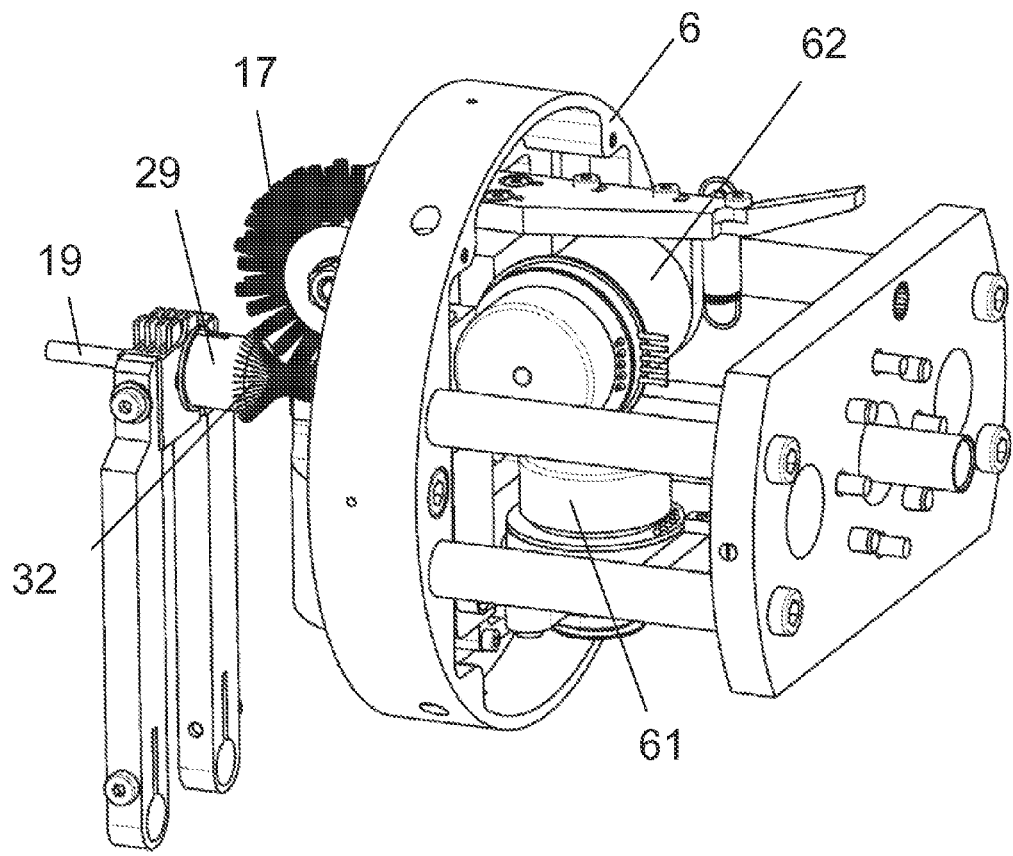
Figure 13:
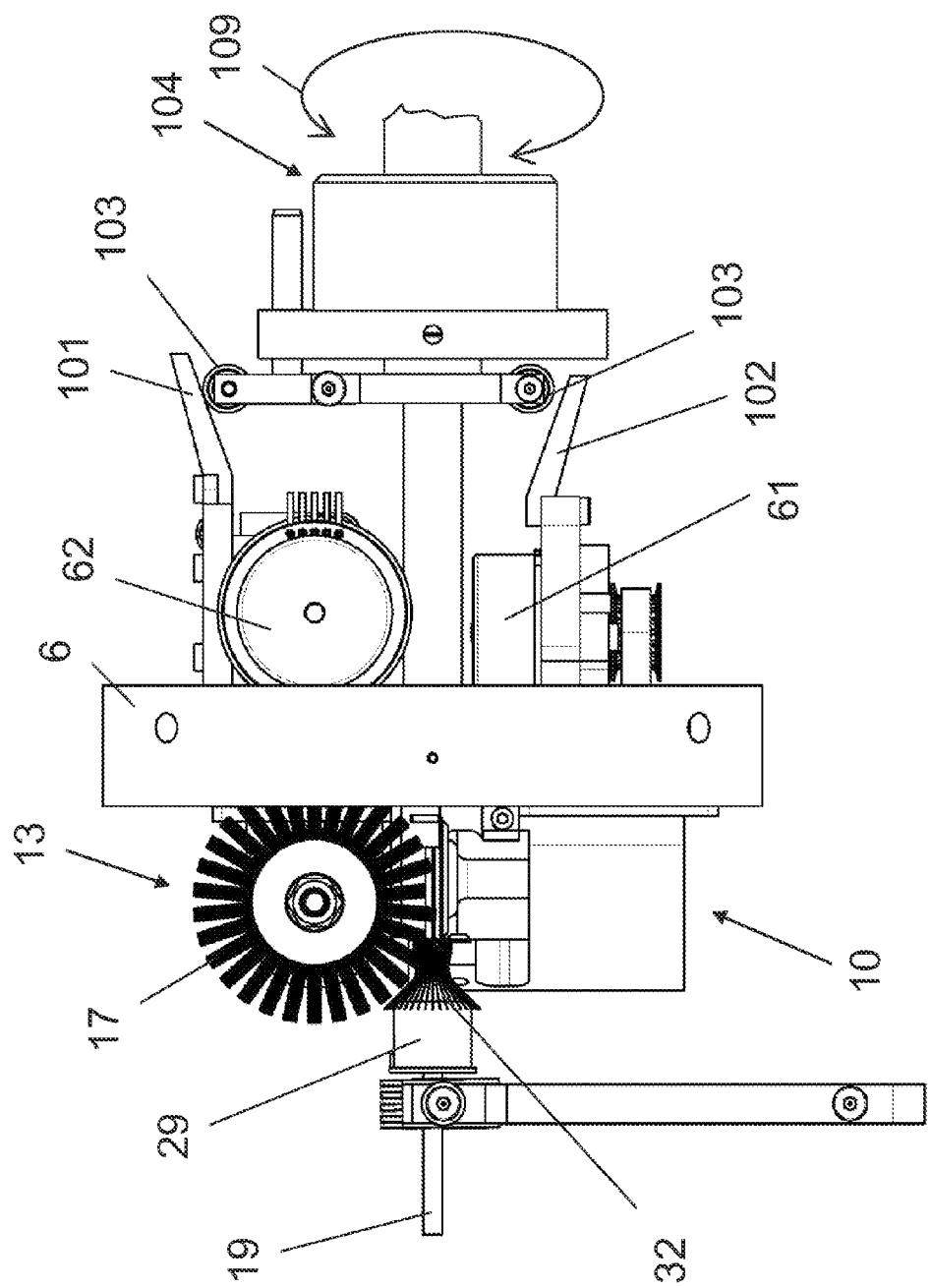
Figure 14:
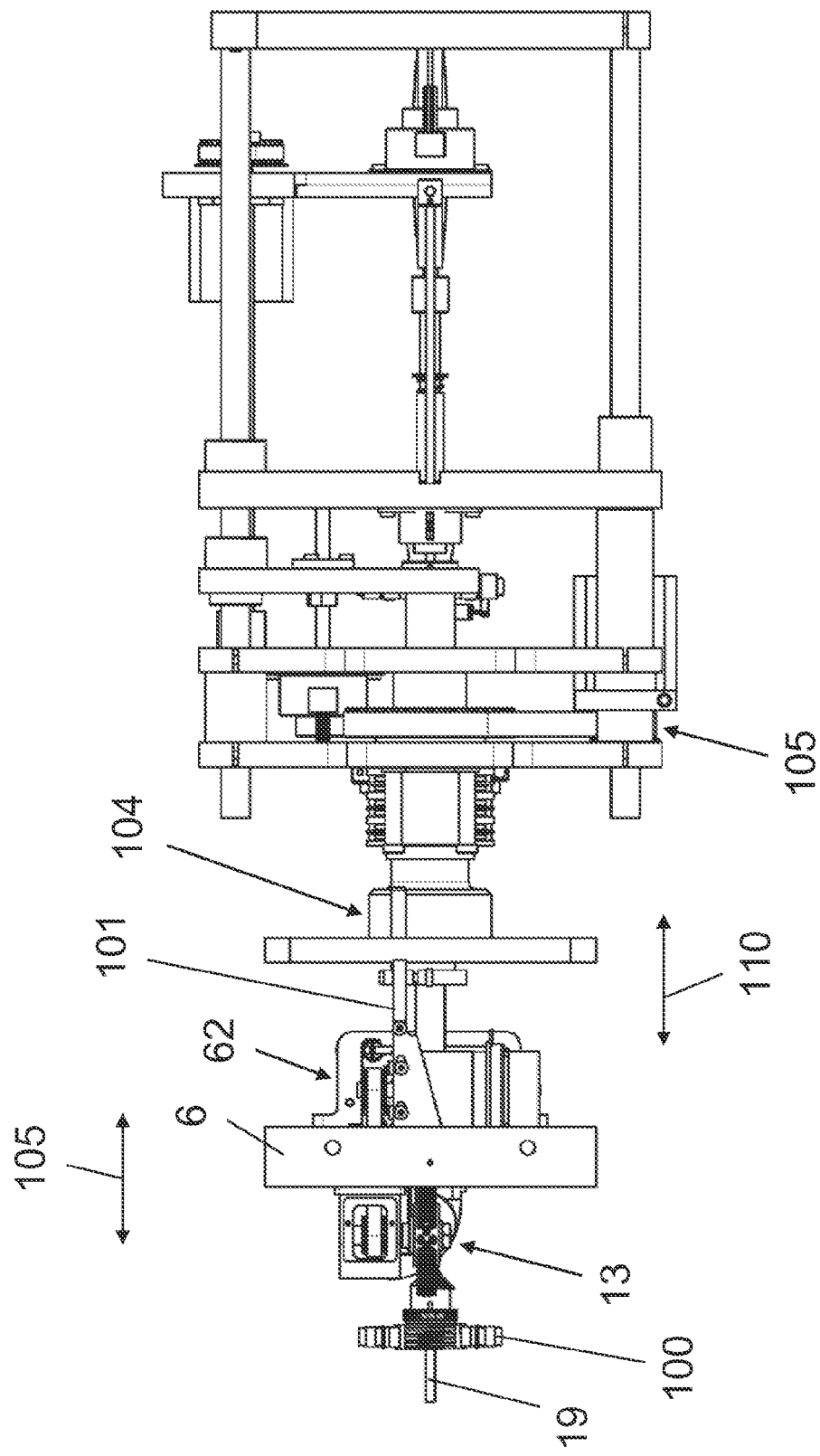

FIGS. 4 to 6 each depict a perspective view of elements of a machine, for illustrating various phases of a subject method;

FIG. 7 depicts a perspective view of a machine, including housing and support as well as drive units;

FIG. 8 depicts a perspective front view of a detail of the version according to FIG. 7 on a larger scale;

FIG. 9 depicts a perspective back side view of the detail of FIG. 8;

FIG. 10 depicts a schematic perspective diagram (partly cut away) of a version of the mounting of the deformation and/or unbraiding unit of the machine;

FIG. 11 depicts a perspective view of a further version of elements of a machine, processing a cable, with a different cutting head;

FIG. 12 depicts a perspective view of the version of FIG. 11 from another direction;

FIG. 13 depicts a side view of the version of FIG. 11; and,

FIG. 14 depicts a view from above onto the version of the machine of FIG. 11.

By way of definition, it should be stated at this point that reference in this specification to "one version(variant)," "this version(variant)," or "the/a version(variant)," and the like, means that a particular feature, structure, or characteristic described in connection with the version or variant may be included in at least one version according to the disclosure. The appearances of phrases such as "in one version (variant)," in various places in the specification are not necessarily all referring to the same version or variant, nor are separate or alternative versions/variants mutually exclusive of other versions/variants. Moreover, various features are described which may be exhibited by some versions and not by others. Similarly, various requirements are described which may be requirements for some versions or variants but not other versions or variants. Additionally, the terms "connected" or "coupled" and related terms are generally used in an operational sense, as operative or operational, and are not necessarily limited to merely a direct connection or coupling. Furthermore, as used throughout this specification, the terms 'a', 'an', 'at least' do not denote a limitation of quantity, but rather denote the presence of at least one of the referenced item, and the term 'a plurality' should be understood to denote the presence of more than one referenced items.

Figure 1:
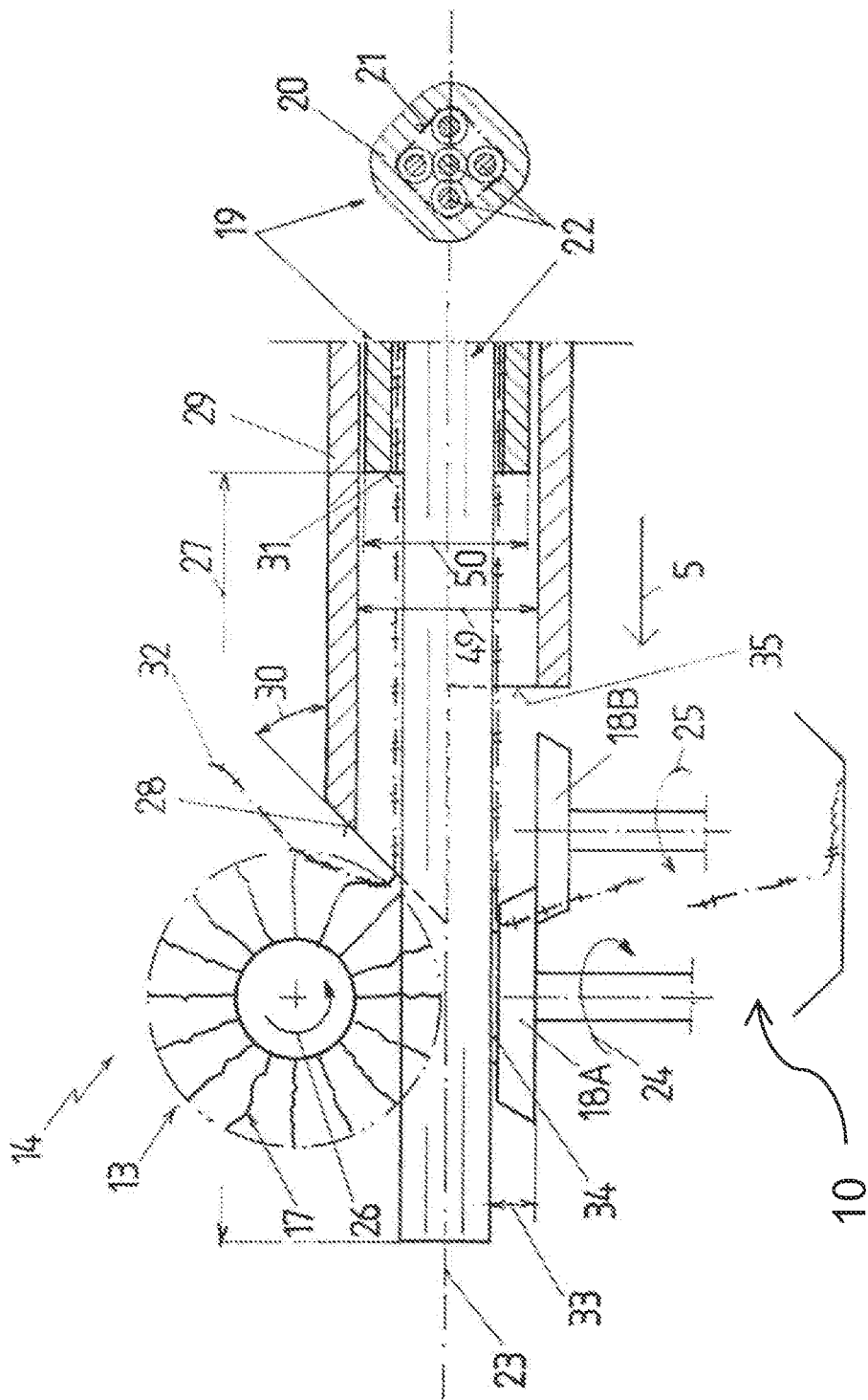
FIG. 1 depicts a schematic cross-section of elements of a machine, processing a cable consisting from insulation, screen and conductors.
Figure 2:
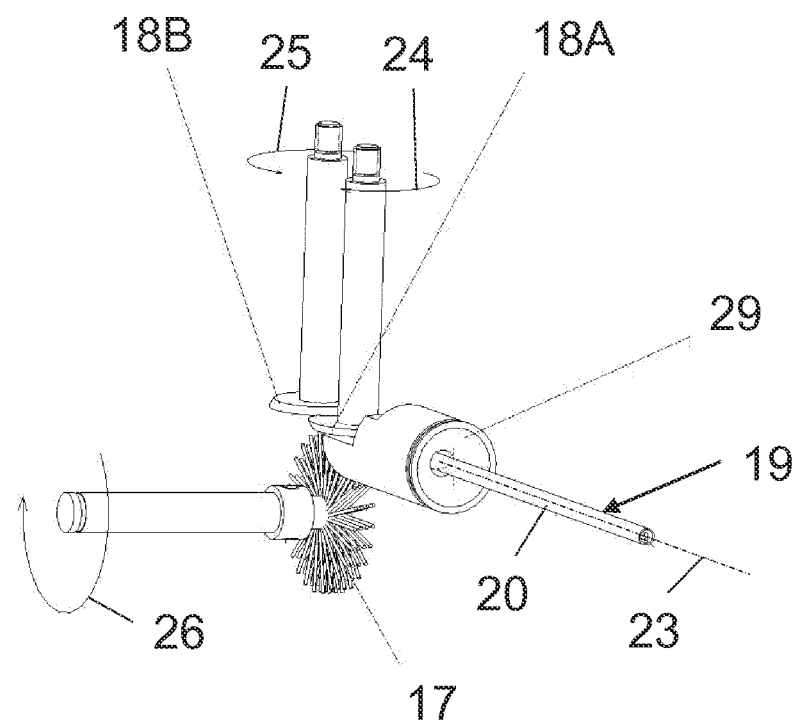
FIG. 2 depicts a perspective view of elements of a machine, processing a cable.
Figure 3:
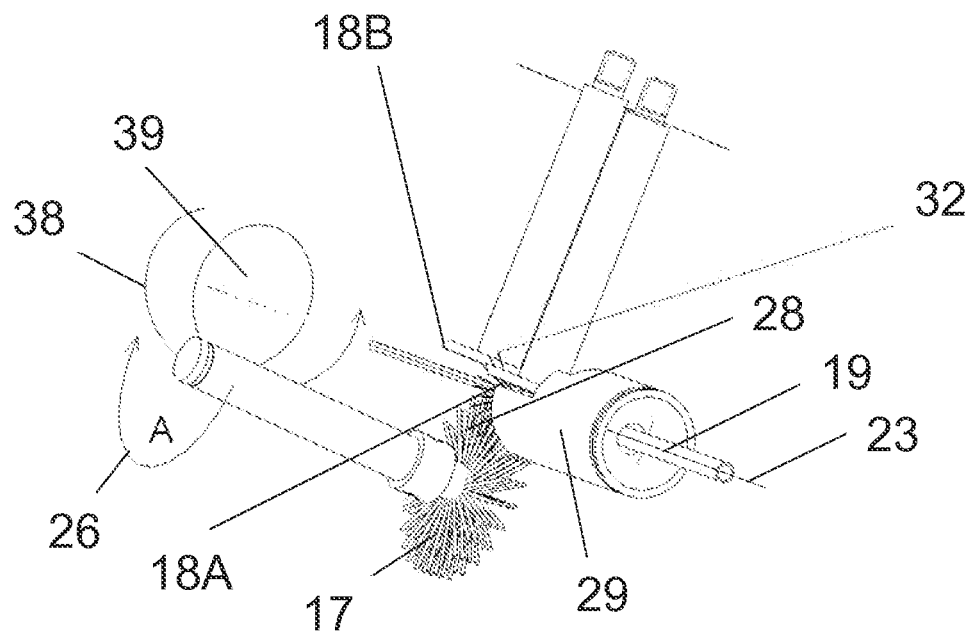
FIG. 3 depicts another perspective view of elements of a machine, processing a cable.

Elements of a machine version within the scope of the present disclosure are depicted in FIG. 1 in a schematic cross-sectional view, in the state during processing a cable 19 (cross-section shown on the right side in FIG. 1). In the depicted case, the cable 19 is a multiconductor cable consisting of an outer sheath, for example an outer insulation 20, a preferably braided screen 21 and, for example, five individually insulated inner conductors 22. The cross-section of the cable 19 is shown to be expressly noncircular in FIG. 1. As is understood, the cable 19 could be of any desired or necessary cross-section and can contain a deliberate number and type of inner conductors 22.

The outer sheath or insulation 20 is removed from the conductors 22 and the screen 21 in common manner (not shown here in detail), to bare the screen 21 for further processing in a predetermined section 27 of the cable. In the depicted version of FIG. 1 a single rotating brush 17 (the direction of rotation is designated by 26 in FIG. 1) of a brush head 13 is used and acting as a deformation unit. The brush 17 could be produced, for example, from known compound fiber materials that are designed to be more rigid toward the axis of rotation of the brush 17 than at the periphery of the brush 17. As a result, the brush 17 protects the layers located under the braided screen 21 and is nevertheless sufficiently stiff to be able to brush up the braided screen 21. Preferably stamped roll-brushes are used, with an outer diameter of typically 50 mm and with approximately 20 bristles per bundle, made for example of polyamide. A rotating and elastically mounted brush 17 or a similar element is capable of completely erecting/lifting layers, or even a braided screen 21, even in the case of a very noncircular cable 19, and is therefore permitting reliable and complete cutting back of the screen residues by the cutting blades 18A and 18B. Resilient or rubber rolls or even belts or the like could be used for film screens or screen layers.

In case of a braided screen 21 the brush 17 or any other similar element of same effect additionally acts as an unbraiding unit (the braid is unbraided (broken up), so that the screen fibers come to rest next to one another and are no longer braided with one another) for gently unbraiding, lifting off and erecting or brushing up the parts or elements 32 of the screen 21 from the inner conductors 22 of the cable 19. Thereafter, these elements 32, residues or filaments of the former screen 21 may be easily cut off from the remainder of the screen 21 by means of—in this version—two rotating cutting blades 18A and 18B of a cutting unit 10. An inverse arrangement of the cutting blades 18A and 18B as depicted is also possible, in which the mutual positions of the cutting blades 18A and 18B are interchanged in the manner of mirror images, i.e. the right cutting blade 18B (in FIG. 1) is arranged closer to the cable 19 in the radial direction than the cutting blade 18A. The cutting blades 18A and 18B rotate in opposite directions and are powered by any suitable drive arrangement of the cutting head 10. The opposite directions of rotation of the cutting blades 18A and 18B are designated by 24 and 25, respectively. It may also be advisable to drive the brush head 13 and the cutting head 10 independently of one another.

The rotating cutting blades 18A and 18B may be designed similarly as two cooperating circular saws (as cutting blade and opposite blade, profiled or un-profiled), and they are preferably insensitive to the material of the braided screen 21 and therefore have a high cutting performance, cutting speed and stability. The tools, i.e. the brush 17 and the cutting blades 18A and 18B, may if necessary be easily and quickly exchanged so that the productivity of the device 1 may be maintained.

The circular rotating brush 17, or any other deforming and/or unbraiding means, for example a resilient roller, a resilient belt or the like, cooperates with an erection surface 28 which in FIG. 1 is in the form of an oblique end face of a support sleeve 29. In such version, the position of the rotating brush 17 relative to the oblique erection surface 28 is not adjustable. As a variant, it may be expedient to arrange the oblique erection surface 28 in an adjustable manner for adjustment of its angle, in particular in a possible embodiment with the erection surface 28 designed as a sheet metal piece (with or without support sleeve 29).

This support sleeve 29 may be exchangeable, one-part or multipart, respectively. By this feature it can be ensured that, after plastic/elastic deformation of the elements 32 of the screen, these elements 32, filaments, stranded wires or the like, are essentially perpendicular to the axis 23 of the cable 19.

The internal diameter 49 of the support sleeve 29 need not exactly correspond to the maximum external diameter 50 of the cable 19, because of a preferred elastic suspension of brush 17 and of cutting blades 18A and 18B independently of one another at least in the radial direction relative to the central axis 23 of the cable 19. Therefore, the cable 19 cannot escape from the processing elements, i.e. the brush 17 and the cutting blades 18A and 18B and the support sleeve 29 can consequently be used for a very wide range of external diameters of the cable 19. Moreover, the cable 19 needs not be centered in a complicated manner. As is understood, at least for adapting the device to an even wider range of cable diameters or to guide any cable very exactly, support sleeves 29 with different internal diameters 49 can be provided. A further advantageous feature of support sleeve 29 is recess 35, required for the cutting blades 18A and 18B, preferably opposite the brush 17 with respect to the cable 19.

The angle 30 between the plane of the erection surface 28 and the axis 23 is therefore preferably chosen to assume a value that, after the brushing, the screen elements 32 stretch back elastically to an angle of about 90° to the axis 23. The oblique erection surface 28 typically makes an angle 30 of about 10 to 80° (depending on the processed cable), with the axis 23 of the cable 19, in order to be able to achieve satisfactory erection and subsequent cutting of the screen parts 32. It should be noted that the value of the angle 30 depends in each case in particular on the material of the brush 17 and of the braided screen 21 and on the rotational and possibly an advance speed of the brush 17.

The screen 21 of the cable 19 is bared at least at one cable end or cable section 27. Thereafter, the bared screen 21 is deformed and/or unbraided, and the deformed section of the screen 21 is cut off. As was explained above, the deformed section is lifted so as to radiate outward substantially in the radial direction—i.e. transversely—relative to the central axis 23 of the cable 19. During the deformation of that section of the screen 21 which is to be removed the elements of the screen 21 are lifted off the inner conductors 22 and/or are erected without axial bead formation and with the aid of an oblique erection surface 28 cooperating with at least one deformation unit.

The above explained processing steps may be performed by a number of brushes 17 and cutting blades 18A, 18B arranged around the circumference of the cable 19, with the erection surface 28 being formed preferably symmetrical around the axis 23 of the cable that is being tapered and narrowing towards the brush head 13. In most cases, however, the above described steps are performed on a screen segment being limited to only a part of the circumference of the cable 19.

To process the whole circumference of the cable in the latter case, the location of all each of the steps rotates synchronously around the cable 19, in particular around its axis 23. This may be done while the cable 19 is held in a certain fixed position or even when the cable 19 is continuously advanced axially. For this purpose, the combined cable processing unit 14, comprising at least the brush 17 and the cutting head 10 with blades 18A, 18B, possibly also the support sleeve 29 with the erection surface 28, revolves around the cable 19 about axis 23, all mentioned elements in synchronous rotation. During this revolution, the cable 19 is advanced by a certain distance, along the axis of rotation 23, in the direction of the arrow 5 (FIG. 1). A clamping device known per se and intended for the cable 19 is not shown here. As is understood, even a device 1 with non-rotatable cable processing unit 14 and/or not executing any linear advance would furthermore be conceivable, if in those cases the cable 19 itself being advanced and/or rotated (with limited torque) for processing.

Teachings according to the present disclosure, in particular the processing unit 14, could be integrated into a cut & strip machine (insulation stripping machine which is designed as a continuous machine). Since the cable feed is already present in the cut & strip machine, the cable processing unit 14 requires no feed in this case. For such integration, the processing unit 14 could either be provided in a mirror-like arrangement on both processing locations (cable ends) when handled within the cut & strip machine, or one processing unit could be provided in a manner movable from a first processing location at one end of the cable 19 to the other processing location at the opposite end of the cable 19. In the latter case, at least the processing unit 14 is preferably designed or adaptable in a manner for operation in both longitudinal directions of the cable 19, in particular with the cable 19 led through the support sleeve 29, which will then be symmetrically built with respect to a plane perpendicular to the cable axis. Alternatively, the processing unit 14 could be mounted on a pivoting support that can be pivoted from one end of the cable 19 to be processed to the opposite end.

In the course of the processing, the cable 19 is advanced by the length of the cable section 27 to be processed, that is until position 31 is reached, where the outer insulation 20 not removed beforehand begins. During this procedure, the cable processing unit 14 revolves around the cable 19, typically several times, and the screen 21 is therefore removed in a spiral manner. Alternatively, the cable 19 can be advanced step-wise and the cutting can be done during the stand-stills by having the cable processing unit 14 revolving around the cable 19 at one fixed longitudinal position and for at least one full rotation of the processing unit 14. At the end of the processing process, the cable advance is stopped and the cable processing unit 14 then as a rule revolves around the cable 19 at least once more. This results in a cut edge of the braided screen 21, which cut edge lies in a plane perpendicular to the central axis of the cable 23. Only an annular residue 33 remains, which corresponds to the thickness of the cutting blade 18A or the thickness of the support plate 34 plus the thickness of the cutting blade 18A. It would, if appropriate, be desirable for the residue 33 as far as possible to be zero. The cutting blade 18A is preferably supported in a gentle manner above a support plate 34 on the braided screen 21 or on a layer underneath or on the inner conductors 22. As a result of the support of the cutting blades 18A and 18B above the stop surface of the support plate 34 and the substantially linear contact, the cutting blades 18A and 18B follow the outer contour of the cable 19 in the best possible manner. Damage to the surfaces located under the braided screen 21 may thus be avoided.

As a result, a spiral processing line is achieved along the cable, as described above, which processing line can be finely adapted to the respective technological circumstances by the suitable choice of the rotational speed of the cable processing unit 14, the advance speed of the cable 19 and (depending on the design of the cable processing unit 14) also the rotational speed of the rotating brush 17 and of the rotating cutting blades 18A and 18B. The axial advance speed and the rotational speed of the rotary head 6 and hence the slope of the spiral cutting line 38 of the cutting head 10 may be adapted in each case to the circumstances. Thus, it is possible to ensure that the screen residue does not exceed a degree which prevents the reliable functioning of the rotating cutting blades 18A and 18B. Moreover, the length of the waste screen pieces can thus be freely set according to the requirements. Another conceivable version is one in which the cable processing unit 14 is advanced together with the brush head 13 and the cutting head 10 and with the lifting surface 28—relative to the fixed cable 19.

In a further version, a mutual axial advance of the cable 19 and/or of the complete cable processing unit 14 is envisaged.

FIGS. 2-6 depict, in various phases, individual schematically represented steps of a method for removing the bared, possibly braided screen 21 from the cable 19 to be processed, by means of the cable processing unit 14 (these drawings showing only the cable and certain elements of a machine necessary for illustration and explained in detail with reference to FIG. 1). In FIGS. 2-6, the support sleeve 29 with its lifting surface 28, the brush 17 and the cutting blades 18A and 18B are shown in their operating position, but rotated through 180° about the axis of rotation 23 in comparison with FIG. 1. Moreover, the cutting blade 18A is now the blade closer to the erection surface 28 in comparison with FIG. 1.

FIG. 4, in particular, depicts the single circular rotating brush 17 of the brush head 13 and the blades 18A, 18B in their position lifted off and with the greatest distance to the cable 19, as assumed in the preparation and setup phase of the processing unit before starting of the cable processing and preferably also after finishing all of the processing steps. An arrow 36 shows the direction of lifting of the cutting head 10. During the lifting and closing, the cutting head 10 rotates about the axis 37. An arrow 38 shows the closing direction of the brush head 13. During the lifting and closing, the brush head 13 rotates about the axis 39.

Preferably, and as shown in FIG. 7, the processing unit 14, including the brush head 13, of the device 1 is mounted in a rotary head 6 so as to be capable not only of being lowered onto and lifted off the cable 19 to be processed, but also to be rotated around the axis of the cable 19. The device 1 is preferably provided in a housing 2 with two horizontal longitudinal guides 3 for a carriage 4, which is displaceable along the longitudinal guides 3 by means of a drive (not shown) in the direction of the arrow 5. The rotary head 6, whose direction of rotation is designated by an arrow 7, is rotatably mounted in the carriage 4 (as is shown in more detail in FIGS. 8 to 10). A tool drive wheel 8 is arranged in a non-rotational manner coaxially with the rotary head 6. A drive wheel 9 of the cutting head 10 has a drive connection to the non-rotating tool drive wheel 8. The cutting head 10 itself is mounted in the rotary head 6 so as to be capable of being lifted off the cable 19 to be processed. The rotary head 6 is equipped with a rotary drive 11 (e.g. electric motor, hydro-motor or the like) whose belt drive is designated by 12. A drive wheel 15 of the brush head 13 likewise has a drive connection to the fixed tool drive wheel 8. The carriage 4 can be provided with a guide sleeve 16 (see FIG. 9). Independent drives of the brush head 13 and of the cutting head 10 have the additional advantage that the cutting quality can be even further improved.

FIG. 10 shows again a detail of the rotary head 6 and the brush head 13 at larger scale. The brush head 13 has preferably a housing 40, which is mounted so as to be tiltable about an axis 40A by means of a mounting sleeve 42. Firstly the drive wheel 15 of the brush head 13 and secondly a pair 43 of bevel gear wheels are fastened to a shaft 41. Here, the pair 43 of bevel gear wheels is arranged in the housing 40 and has a drive connection to the brush 17 through a shaft 44. The drive wheel 15 is connected to the fixed tool drive wheel 8, which in turn supports a rotating drive shaft 45. The entire rotary head 6, in whose bore 46 the brush head 13 is rotatable mounted by a mounting sleeve 42, is fastened so as to be concomitantly rotatable on the drive shaft 45. The rotational movement about the axis 40A permits lifting off the brush head from the cable 19 and closing of said brush head. A pulley 47 of the belt drive 12 is fastened at the other end of the drive shaft 45. The tiltable housing 40 of the brush head 13 is loaded by a pre-stressed spring 48 which presses the brush 17 elastically (and gently) onto the respective outer contour of the cable 19. In principle, the movements of each of the units 10, 14, and/or their moveable elements, e.g. brush 17, cutting blades 18A, 18B, 18C, can be decoupled or several or all of these movements can be coupled in arbitrary combinations.

FIG. 11 shows the essential elements of the processing unit 14 of another version in perspective view on large scale. Similar to the first described embodiment, again a single rotating brush 17 of a brush head 13 is acting as a deformation unit and possibly as an unbraiding unit. The elements 32, residues or filaments of the former screen 21 are cut off from the remainder of the screen by means of—in this embodiment of FIG. 11 and following—one rotating cutting blade 18B and one nonrotational cutting blade 18C of a cutting unit 10. Cutting blade 18B can be powered by any suitable drive arrangement of the cutting head 10, preferably again a belt drive 60 with motor 61 (see FIG. 12).

While the rotating cutting blade 18B can be designed as circular saw (profiled or un-profiled), non-rotational cutting blade 18C is preferably designed with a straight cutting edge. Both blades 18B, 18C are insensitive to the material of the braided screen 21 and therefore have a high cutting performance, cutting speed and stability.

Instead of any type of rotating or fixed cutting blades 18A, 18B or 18C, alternative cutters could be used. Examples could be a laser or water cutting device, scissors, or a pair of ring blades. Even a single blade without any opposite part could be conceivable for cutting the erected and unbraided screen elements, as would be other methods like thermal separation methods.

While the above variant of the cutting head 10 could also be used with a lifting surface as described with regard to FIGS. 1 to 10, it is preferably combined with another version of a support sleeve 29. The erection surface 28 of this support sleeve 29 comprises an essentially plane front face, followed by a cylindrical section around the cable 19 and the rotational axis 23 of the rotary head 6. Then, after a further tapered section with growing diameter in the direction away from the brush 17 again a cylindrical section follows. The elements 32 of the screen that are lifted off from the conductors 22 are bent over the front plane, the first cylindrical section and then the tapered section, whereby the first section of these elements 32 are deformed to be essentially perpendicular to the axis 23 of the cable 19.

Reference numeral 100 designates a clamping mechanism for the cable. The angle between the tapered section of support sleeve 29 and the axis 23 of the cable 19 will preferably correspond to the angle of the lifting surface 28 of the embodiment of FIGS. 1 to 10. To process the whole circumference of the cable, the cutting head 10 and the brush head 13 are being rotated synchronously around the cable 19 and the rotationally symmetrical support sleeve 29. All other processing steps and variations thereof can again be performed as described above in connection with the versions of the machine according to FIGS. 1 to 10.

In FIGS. 13 and 14 a preferred example for a mechanism for lowering and lifting the brush head 13 and the blades 18B, 18C with respect to the cable 19 or the support sleeve 29, respectively, is shown. Brush head 13 is associated with a cam guide 101, and in the same manner cutting head 10 is associated with a second cam guide 102. Both cam guides 101, 102 are cooperating with two members, preferably rolls 103, that are mounted in a defined radial distance to axis 23 on a rotational member 104, rotatable around the axis 23 of the cable 19 as indicated by arrow 109 in FIGS. 13 and 14, in synchronicity with the rotation of rotational head 6. Moreover, the rotational member 104 is movable back and forth parallel to said axis 23 (as indicated by arrow 110) but independently with regard to the rotary head 6. The drive arrangements for automatic movement of the rotational member 104 can be of common type and are not shown here.

An axial movement of element 104 with respect to rotary head 6 causes the rolls 103 to glide along the oblique guides 101, 102. When moving the rolls to the left in FIG. 13 the guides 101, 102 are forced away from the cable 19 in radial direction. Because of the mounting of brush head 13 and cutting head 10 movable to and away from the axis 23 and/or cable 19 along an essentially straight path this axial movement of the rolls 103 is converted into a radial movement of brush head 13 and cutting head 10. In the direction to the cable 19 the brush head 13 and the cutting head 10 is biased by elastic means like springs or the like. Moving the rolls 103 to the right in FIG. 13 allows a lowering of guides 101, 103 onto the axis 23 and a lowering of the brush head 13 and cutting head 10 onto cable 19 due to the effect of the elastic means.

The brush head 13 is freely adjustable with respect to its distance to the cable 19, the distance being dependent on the type and diameter of the cable 19 and the screen to be treated. The cutting head 10 on the other hand, has a defined minimal distance to the cable 19, which minimal distance is defined by a stop or a blocking position given preferably by support sleeve 29 to ensure the optimal distance between the cutting blades 18B, 18C to the cable 19. Even if the rolls 103 and guides 101, 102 would allow a further approximation of cable 19 and cutting head 10, the support sleeve 29 will prohibit such approximation. Consequently, the position of brush head 13 with respect to the cable 19 is adjustable solely by the cam guide 101, 102 and roll 103 arrangement, while the lowest position of the cutting head 10 is defined by the choice of a certain support sleeve 29.

It is understood that instead of the above described mechanism other arrangements could be used for raising and lowering the brush head 13 and the cutting head 10, for example by levers 102 and 103 associated with said elements 13, 10, preferably provided with rollers or other means for minimizing friction, to glide or move otherwise corresponding to a contour of a cam guide.

Additionally, a contact ring 105 is provided on member 104 to ensure data transmission to and from a control unit of device 1 and to ensure the power supply to any consumer, in particular the motor 61 of the cutting head 10 and/or the motor 62 for the brush head 13, which motor 62 drives brush 17 by belt 63. Rotational member 104 is then connected to the consumers by means of electric lines and to sensors and/or actors by means of control lines (not shown).

In another version, both the brush 17 itself or the entire brush head 13 and the cutting blades 18A and 18B themselves, or the entire cutting head 10 of the cable processing unit 14 are mounted independently of one another relative to the axis of rotation 23, and elastically. Thus, the brush 17 and the cutting blades 18A and 18B can exactly follow the respective outer contour of the cable 19, in particular when used with noncircular cables. It should be noted that the cutting head 10 may be elastically mounted (not shown) in a similar manner.

As has been indicated, the variants explicitly set forth only represent a proportion of the many possibilities for the invention and should not be used to limit the field of application of the invention. For the person skilled in the art, it should be straightforward to adapt the invention to requirements, based on the considerations shown here, without departing from the protected scope of the invention. Moreover, reference is made to the fact that parts of the machines shown in the figures may also form the basis for independent inventions. It should also be understood in the context of the preceding discussion that the present invention is not limited in any manner to the described and drawings-depicted implementations, but may be realized in many forms and dimensions without abandoning the claimed region of protection. For example, in implementations, the materials that may be employed and also, as well, the dimensions of particular elements, may be according to the demands of a particular construction. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques and structures described and illustrated herein should be understood to be illustrative and exemplary, and not necessarily limiting upon the scope of the present invention. The scope of the present invention is defined by the appended claims, including known equivalents and unforeseeable equivalents at the time of filing of this application.

LIST OF REFERENCE LABELS

1—Device for removing a screen
2—Housing
3—Longitudinal guides
4—Carriage
5—Direction of advance of the rotary head 6—Rotary head
7—Direction of rotation of the rotary head
8—Tool drive wheel
9—Cutting head drive wheel
10—Cutting head
11—Rotary drive
12—Belt drive
13—Brush head
14—Cable processing unit
15—Brush head drive wheel
16—Guide sleeve
17—Brush as a deformation unit
18A, 18B, 18C—Cutting blades
19—Cable
20—Outer insulation
21—Braided screen
22—Inner conductor
23—Axis of rotation and axis of cable
24—Direction of rotation of the cutting blade 18A
25—Direction of rotation of the cutting blade 18B
26—Direction of rotation of the brush
27—Cable section to be processed
28—Erection surface
29—Support sleeve
30—Angle of the oblique erection surface to axis of cable
31—Position of end of cable processing
32—Screen residues to be cut off
33—Residue that has been cut off
34—Support plate
35—Recess
36—Direction of rotation of the cutting head
37—Axis for closing movement of the cutting head
38—Direction of rotation of the brush head or spiral cutting line
39—Axis for closing movement of the brush head
40—Housing of brush head
40A—Axis for tilting of the housing of the brush head
41—Shaft
42—Mounting sleeve
43—Pair of bevel gear wheels
44—Shaft
45—Drive shaft
46—Bore
47—Pulley
48—Spring
49—Internal diameter of the support sleeve
50—Theoretical or maximum external diameter of the cable
60—Belt for driving rotary blade
61—Motor for driving rotary blade
62—Motor for driving brush
63—Belt for driving brush
100—Cable clamping mechanism
101—Cam guide
102—Lever for moving brush head
103—Lever for moving cutting head
104—Rotating member
105—Contact ring
109—Direction of rotation of rotational member
110—Direction of axial movement of rotational member and cam guide

What is claimed is:

1. A machine for removing screen from cable comprising, a cable screen deformation unit, said cable screen deformation unit including a rotating member configured to press lifted cable screen onto a lifting surface, said rotating member having an axis of rotation, said axis of rotation being oblique to a cable-longitudinal-axis section taken at a location of said rotating member, said rotating member being movable relative to cable in a direction transversely to a cable longitudinal axis, said rotating member being elastically biased onto the cable, said cable screen deformation unit including a lifting surface, said lifting surface having a section oriented oblique relative to the cable longitudinal axis; and, a cutting head configured to cut off deformed screen, and at least one rotating cutting blade in said cutting head; and, at least one rotationally fixed cutting blade cooperating with said at least one rotating cutting blade for screen cutting.

2. The machine for removing screen from cable as claimed in claim 1 wherein, said oblique section has an adjustable angle relative to the cable longitudinal axis.

3. The machine for removing screen from cable as claimed in claim 1, further comprising, said rotating member being a powered brush.

4. The machine for removing screen from cable as claimed in claim 1, further comprising, said rotating member, said cable screen deformation unit, and said cutting head being arranged in a powered rotary head rotatable about cable axis.

5. The machine for removing screen from cable as claimed in claim 4 wherein, said rotating member and said cutting head are driven independently of one another.

6. The machine for removing screen from cable as claimed in claim 4, further comprising, at least one drive unit configured to effect relative displacement between said rotary head and the cable along an axis of rotation of said rotary head.

7. The machine for removing screen from cable as claimed in claim 1, further comprising, a support sleeve for surrounding he cable, said support sleeve being formed as a tubular piece; and, said lifting surface being part of said support sleeve.

8. The machine for removing screen from cable as claimed in claim 7 wherein, said tubular piece has a cylindrical section followed by a tapered section.

9. The machine for removing screen from cable as claimed in claim 1, further comprising, said lifting surface is rotationally fixed; and, said rotating member and said cutting head are arranged in a powered rotary head and are synchronously rotatable about said lifting surface.

10. The machine for removing screen from cable as claimed in claim 9, further comprising, at least one drive unit configured to effect relative displacement between said rotary head and the cable along an axis of rotation of said rotary head.

11. The machine for removing screen from cable as claimed in claim 1 wherein, said cutting head is movable relative to the cable, transversely to the cable longitudinal axis.

12. The machine for removing screen from cable as claimed in claim 1, further comprising, two cooperating rotating cutting blades in said cutting head; and, said cutting head being movable relative to the cable, transversely to the cable longitudinal axis.

13. The machine for removing screen from cable as claimed in claim 1, further comprising, at least one cam guide associated with said rotating member, said at least one cam guide cooperating with an axially displaceable, radially fixed member so as, to controllably raise and lower said rotating member relative to the cable.

14. The machine for removing screen from cable as claimed in claim 1, further comprising, at least one cam guide associated with said cutting head, said at least one cam guide cooperating with an axially displaceable, radially fixed member so as to controllably raise and lower said cutting head relative to the cable.

15. A method for removing screen from cable having a cable screen deformation unit, said cable screen deformation unit including a rotating member configured to press lifted cable screen onto a lifting surface, said rotating member having an axis of rotation, said axis of rotation being oblique to a cable-longitudinal-axis section taken at a location of said rotating member, said rotating member being movable relative to cable in a direction transversely to a cable longitudinal axis, said rotating member being elastically biased onto the cable, said cable screen deformation unit including a lifting surface, said lifting surface having a section oriented oblique relative to the cable longitudinal axis; and, a cutting head configured to cut off deformed screen, and at least one rotating cutting blade in said cutting head; and, at least one rotationally fixed cutting blade cooperating with said at least one rotating cutting blade for screen cutting, the method comprising the steps of: deforming a section of screen limited to a part of the circumference of a cable by the steps of (a) lifting off the screen from an inner conductor at least over a part of the circumference of the cable, and, (b) pressing the lifted screen onto a lifting surface by bending it backwards in the direction of undeformed screen; cutting off the deformed section of screen; and, performing all of said steps in synchronous rotation around an at least temporarily spatially fixed cable while continuously advancing the cable axially.

16. The method for removing screen from cable as claimed in claim 15, further comprising the step of: continuously deforming, lifting off, and pressing the screen onto the lifting surface.

17. The method for removing screen from cable as claimed in claim 15, further comprising the steps of: moving a rotating member relative to the cable in a direction transversely to a cable longitudinal axis; and, elastically biasing said rotating member onto the cable.

18. The method for removing screen from cable as claimed in claim 15, further comprising the step of: providing an adjustable oblique section of the lifting surface.

19. The method for removing screen from cable as claimed in claim 15, further comprising the step of: relatively displacing a rotary head and the cable along an axis of rotation of the rotary head.

20. A machine for removing screen from cable comprising:
a cable screen deformation unit having a rotating member that rotates about a rotational axis and presses lifted cable screen onto a lifting surface, the rotational axis of the rotating member is oblique with respect to a cable longitudinal axis of a cable taken at a location of the rotating member;
the rotating member is movable relative to the cable in a direction transverse to the cable longitudinal axis, the rotating member is elastically biased toward the cable so as to contact the cable;
the cable screen deformation unit comprises a lifting surface that has a surface section which is oriented oblique relative to the cable longitudinal axis;
a cutting head comprising first and second cutting blades, the first cutting blade rotates about a blade rotational axis and the second cutting blade is non-rotatably fixed with respect to the first cutting blade, the first cutting blade engages the second cutting blade to cut off deformed screen from the cable;
the first and the second cutting blades are movable with respect to the cable about the cable longitudinal axis.

\* \* \* \* \*